United States Patent [19]

Gulko et al.

[11] 4,145,208

[45] Mar. 20, 1979

[54] METHOD AND COMPOSITION FOR IMPROVING THE FUNCTIONING OF DRIP IRRIGATION SYSTEMS

[75] Inventors: Arie Gulko; Dahlia S. Greidinger, both of Haifa, Israel

[73] Assignee: Fertilizers & Chemicals Ltd., Haifa, Israel

[21] Appl. No.: 860,900

[22] Filed: Dec. 15, 1977

[30] Foreign Application Priority Data

Jan. 12, 1977 [IL] Israel .................................... 51248

[51] Int. Cl.$^2$ ..................... C05C 9/00; C05B 15/00
[52] U.S. Cl. ........................................ 71/29; 71/28
[58] Field of Search ................ 71/1, 28, 29, 30; 47/48.5, DIG. 4

[56] References Cited

U.S. PATENT DOCUMENTS

| | | | |
|---|---|---|---|
| 1,200,806 | 10/1916 | Bosch | 71/30 |
| 2,855,286 | 10/1958 | Harvey | 71/29 |

FOREIGN PATENT DOCUMENTS

| | | | |
|---|---|---|---|
| 18536 | 3/1920 | United Kingdom | 71/29 |
| 335600 | 9/1930 | United Kingdom | 71/29 |
| 816573 | 6/1955 | United Kingdom | 71/29 |
| 807107 | 1/1959 | United Kingdom | 71/29 |

*Primary Examiner*—S. Leon Bashore
*Assistant Examiner*—Chris Konkol
*Attorney, Agent, or Firm*—Schwartz, Jeffery, Schwaab, Mack, Blumenthal & Koch

[57] ABSTRACT

The present invention relates to a method for improving the smooth functioning of drip irrigation utilizing some nitrogen-based compositions.

The method consists in providing to the solution supplied to drip irrigation, a pH from about 0.05 to about 3.0, utilizing an aqueous solution of urea nitrate having a weight concentration from about 28 to 0.1 percent respectively.

The aqueous solutions utilized in drip irrigation may also contain various fertilizer substances thus providing the desired N:P:K formulations.

13 Claims, No Drawings

METHOD AND COMPOSITION FOR IMPROVING THE FUNCTIONING OF DRIP IRRIGATION SYSTEMS

The present invention relates to a method for improving the smooth functioning of drip irrigation. More particularly it relates to the utilization of nitrogen-based compositions in drip irrigation.

The drip method of irrigation has gained considerable interest during the last few years. The definition of drip irrigation is the frequent slow and controlled application of water to soil through mechanical devices or narrow orifices called emitters located along the water delivery line. Water is carried through a pipe, while the emitters dissipate the pressure in the pipe distribution network by means of either a small diameter orifice or a long flow path, and thereby decrease the water pressure to allow discharge of small amounts of water. Thus the emitter which is an integral part of the drip irrigation system must fulfil the two main requirements which are rather contradictory:

1. To possess a rather narrow orifice in order to provide a relatively low but uniform and constant discharge, and
2. to have a relatively large flow cross-section in order to reduce clogging of the orifices.

However by utilizing a large flow cross-section, the first requirement cannot be achieved and therefore no drip irrigation will occur. Actually, the problem of clogging constitutes the main limitation on development of an efficient and smooth operating drip irrigation system.

Recently drip irrigation is not only considered just another method of applying water to plants. It is rather developing as a new agrotechnical approach to growing row crops under highly controlled conditions of soil moisture, fertilizer application and pest control, having a significant effect on crop response, timing of harvest and quality of yield. This approach is now commercially utilized in field, orchards and nurseries as well as on a great variety of plants such as fruit trees, grape vines, row crops, flowers etc.

Fertilizer is now considered an integral part of the drip irrigation system, and this method of irrigation provides the most convenient means of supplying nutrient materials. The direct application of fertilizer at the correct time through the irrigation system to the region where most of the feeder roots develop, will result in an increased yield as well as in more efficient use of the fertilizer. By reducing the amount of fertilizer and the interval between applications, it is possible to maintain a uniform level of nutrients and to control the nutrient supply in the soil in accordance with changing plant needs during the growing season.

Recent reviews have appeared which recommend the application of plant nutrients with drip irrigation system, pointing out the labour and energy savings and flexibility in timing nutrient applications. Thus according to R. S. Rauschkolb (Phosphorus Fertilization with drip irrigation, Soil Sci. Soc. Amer. J. vol. 40, 1976, pages 68–72), higher phosphorus content was measured in seedling leaves when the fertilizer was applied by drip irrigation, than when it was banded below the seed at planting. However, the application of phosphorus fertilizer through drip or sprinkler irrigation systems is not commonly recommended, because of the possible precipitation of phosphates in irrigation pipes and clogging of the emitters. In order to overcome this disadvantages, it has been suggested to utilize organic phosphate compounds such as glycerophosphates. Sodium and calcium salts of glycerophosphoric acid are very soluble in water and are especially useful as phosphate fertilizers capable of being applied through irrigation system. However, the estimated cost of glycerophosphates is almost twice to thrice that of inorganic phosphates, so that their utilization would be recommended only in rare special cases.

The clogging of the emitters is indeed the most important problem in the design and operation of drip irrigation system. The clogging of drip irrigation may result by water sediments (carbonates, clays etc.) by precipitates from fertilizers (e.g. phosphates) added into the irrigation water or by combination thereof. The presence of phosphates in the sediments, may also involve developing of other undesired organic and biologic components.

A relatively successful method has recently been developed, according to which phosphoric acid has been utilized as a source of phosphorus fertilizer. After each application, the irrigation lines were flushed immediately with water slightly acidified with sulfuric or hydrochloric acid. This was claimed to prevent entirely the plugging of emitters by precipitates phosphates. The disadvantage of this method is of course the utilization of acids which incur costs and are of no nutritional value. Another drawback of the method is the requirement for washing of the system, which in addition to handling, is time consuming and causes a discontinuity in the drip irrigation method. Based on the same approach, when a nitrate fertilizer would be required, one may utilize nitric acid solutions. In this case there exists the human hazard at farm level, in addition to the damage to the plastic equipment, as well as the undesirable handling, transportation and working conditions, from the evolved nitrogen oxide gases. It is an object of the present invention to provide a method for improving the smooth functioning of drip irrigation. It is another object of the present invention to provide a nitrogen-based composition for the drip irrigation system which clears or avoids the eventual clogging in the emitters. It is yet another object of the present invention to provide a nitrogen-based composition for drip irrigation system which is convenient and safe to transport and handle, being economical in operation. It has now been found that the foregoing and related objects can be readily attained by the use of a slow release acid composition comprising urea nitrate. Thus the invention consists of a method for improving the smooth functioning of drip irrigation by applying a nitrogen-based composition being characterized by the fact that the said composition comprises urea nitrate which provides a pH ranging from about 0.05 to 3.0, when urea nitrate is added to an aqueous solution in a quantity ranging from about 28 to 0.1 percent respectively based on the weight of the aqueous solution. Optionally, one or more additional nitrogen, phosphorus or potassium fertilizer may also be added to the aqueous solution, providing that the pH of the resulting solution has the pH in the range of 0.05 to 3.0 and preferably 0.25 to 2.6.

Urea nitrate containing about 34% nitrogen may also be considered a valuable rich nitrogen fertilizer, being completely available to plants. Since by its dissolution in water it results in an acidic pH, it was found according to the present invention that it would be particularly suitable for drip irrigation fertilization giving rise to a controlled source of nitric acid. By its slow release of acidity, it will reopen or avoid any eventual clogging of the emitters by precipitates. Such precipitates are caused by dissolved minerals that come out of solution due to a change in pH or temperature, and from the crust formed inside the pipes and emitters which will first slow the flow and ultimately cause full clogging. In particular, calcium, magnesium, phosphates and iron precipitates are a potential problem with most well water as well as the common phosphate fertilizer salts. Being a nonhygroscopic solid, urea nitrate overcomes the common drawback in transportation and handling hazards and utilization of nitric acid. While nitric acid of above 57% concentration (about 12N and above) as commercially available is dangerous to skin, the solid urea nitrate is completely inert and odorless. Since the water will be added by the ultimate user, the composition is in solid form during transit. This not only decreases the expenses of transportation by keeping the weight to a minimum per unit of available nitrogen, but it also facilitates packaging and handling at all stages. It can be packed and stored in inexpensive plastic (e.g. polyethylene) bags compared with the particular relatively expensive containers (glass or stainless steel) required in the case of nitric acid. The working solutions will be prepared in any suitable manner, by dissolving the solid urea nitrate in the corresponding quantity of water. Urea nitrate will have also a beneficial effect against common bacteria acting as a disinfectant agent.

Urea nitrate has a relatively limited solubility in water and therefore when applied in drip irrigation, will provide a substantially constant concentration of acidity for a prolonged period of time and thus the low pH will persist much longer than when nitric acid solution would be utilized. Moreover, the solution of urea nitrate would not attain an equilibrium in the dynamic system which prevails in drip irrigation, so that the concentration would not surpass the equivalent of 1.2 N of $HNO_3$. The prolonged acidity has a particular advantage in preventing or opening the clogging of emitters by precipitates of carbonates, phosphates, iron salts etc. which are generally present in the water supplied to irrigation systems. This is in addition to the beneficial effect of the nutrient value of urea nitrate. The result of this advantage will be evidenced by the spectacular yields which can be obtained by this technique of fertilization.

According to another embodiment of the present invention other fertilizer constituents or micro-elements may be advantageously included with the urea nitrate supplied to the drip irrigation system. Examples of such fertilizers constituents are: urea phosphate, monoammonium phosphate, urea, potassium chloride, potassium nitrate, ammonium polyphosphate etc. Thus it will be possible to prepare different "tailor-made" compositions comprising urea nitrate with higher nitrogen content and one or more additional phosphate or potassium fertilizer constituent(s) according to the particular crop to which the fertilizer will be applied. This type of fertilizer application is much more efficient than any of the conventional methods, feeding the plant with small, frequent and fully balanced nutrient diets. Special advantage for the present invention can be attributable in fertilization to the composition urea nitrate-urea, in particular when an inexpensive nitrogen source is required.

The method according to the present invention has a particular advantage, when phosphate salts are incorporated in the compositions for fertilization, since the nitrate will drive away the phosphate. This is in contrast to the common known concept that nitrates are generally more soluble than phosphates. The phosphate salts will go out first from the system, due to their higher solubility compared with urea nitrate; thus only after the phosphate has left the system, the aqueous acidic solution of urea nitrate which will contain also any impurity present in water will pass through the irrigation system, dissolving any possible precipitate and avoiding decrease of flow or clogging. Therefore the method according to the present invention will provide a most economic way of phosphorus fertilization, the costs of the common phosphate salts being about half of the organic phosphates (glycerophosphates) proposed for drip irrigation.

The main requirement for the compositions to be utilized as phosphate fertilizer compounds together with the urea nitrate for the drip irrigation system, is the provision of the low pH existence in the range of about 0.05 to 3, and preferably between 0.25 to 2.6. At this pH range, no clogging will occur in the pipes or emitters of the irrigation system. It also enables the utilization of impure agricultural grade fertilizers desired to be incorporated, which may contain acidic soluble impurities. The pH below 3.0 is obtained by an aqueous solution containing less than about 1 g/l urea nitrate. In case that the danger of clogging is more critical, due to the poor quality of the water supplied to the irrigation system or to other fertilizer component which has a tendency to precipitate, into the pipes, a higher concentration of urea nitrate with a corresponding lower pH will be preferred. Special advantage and very useful compositions are attributed to mixtures of urea nitrate-urea phosphate, in particular when relatively high N:P ratios are required. A person skilled in the art will select the most adequate concentration of urea nitrate according to the particular fertilizer composition to be utilized in the drip irrigation, the crop required, as well as the type of soil to be fertilized.

The entire method is very simple to be utilized even by unskilled workers without any hazard. It has the advantage that it is one stage application, functioning continuously and thus the system can be automatically controlled. When other fertilizers would be required to be applied, they can either be introduced separately in the system at the desired ratio N:P:K (1:1:1, 2:1:0; 1:1:0 etc.) before their use, or adequate compositions containing the components in the desired ratio may be prepared in advance and distributed ready for use.

The apparatus utilized for applying the fertilizer compositions through the drip irrigation system are of several types: (1) fertilizer tanks; (2) fertilizer pumps and (3) venturi-type meters. In fertilizer tanks, the tank is connected in parallel to the irrigation pipe and by creating a pressure differential between the tubes entering and leaving the tank, part of the irrigation water flows through the tank and dilutes the nitrogen-based fertilizer solution composition proposed according to the present invention. In fertilizer pumps, the fertilizer solution is introduced into the irrigation system by means of a pump. Such pump may be operated either by an external force and introduces the solution into the system under pressure or by the water pressure of the system. In venturi-type meter, the suction of the fertilizer composition may occur from an open or closed container. The known criteria of utilizing either type of the above apparatus in drip irrigation system with water, may be also successfully utilized with the nitrogen-based compositions according to the present invention.

In order to further illustrate the nature of this invention and the manner of practicing it, the following Examples are presented for clearness of understanding only and no limitation should be understood therefrom.

EXAMPLE 1

An amount of 32 Kg. urea nitrate (containing 10% humidity) was introduced into a 60 l fertilizer tank which was continuously fed with tap water. The resulting solution was supplied to the irrigation system.

The following pH were measured in the samples taken at various intervals and rates:

| Sample No. | Rate l/h | Running time (minutes) | pH of the solution |
|---|---|---|---|
| 1 | 1500 | 10 | 0.95 |
| 2 | 1500 | 20 | 1.6 |
| 3 | 900 | 10 | 0.75 |
| 4 | 900 | 35 | 1.6 |
| 5 | 600 | 10 | 0.75 |
| 6 | 600 | 45 | 1.2 |

EXAMPLE 2

An anount of 220 g urea nitrate and 70 g monoammonium phosphate (48% $P_2O_5$, 11% N) were introduced into a vessel (500 ml capacity) which was continuously fed with tap water. The resulting solution was supplied to the irrigation system.

The following pH and analyses were measured in the samples taken, the rate being between 3 to 6 l/h:

| Sample No. | Amount of outgoing solution (ml) | pH | g/l $P_2O_5$ | g/l urea nitrate |
|---|---|---|---|---|
| 1 | 1200 | 0.5 | 1 | 75 |
| 2 | 1500 | 0.65 | 0.1 | 55 |
| 3 | 2100 | 2.26 | Not measured | |

EXAMPLE 3

An amount of 180 g. urea nitrate and 100 g liquid ammonium polyphosphate (11% N, 37% $P_2O_5$) were introduced into a vessel (500ml capacity) which was continuously fed with tap water. The resulting solution was supplied to the irrigation system.

The following pH and analyses were measured in the samples taken:

| Sample No. | Amount of outgoing solution (ml) | pH | g/l $P_2O_5$ | g/l urea nitrate |
|---|---|---|---|---|
| 1 | 1100 | 0.55 | 1 | 71.3 |
| 2 | 1500 | 1.13 | 0.1 | 9 |

EXAMPLE 4

An amount of 270 g of an homogeneous mixture of urea nitrate and ammonium polyphosphate (12% N, 60% $P_2O_5$), containing 15.1% $P_2O_5$ and 15.8% N (as urea) was introduced into a vessel (500 ml capacity) which was continuously fed with tap water. The resulting solution was supplied to the irrigation system.

The following pH and analyses were measured in the samples taken:

| Sample No. | Amount of outgoing solution (ml) | pH | g/l $P_2O_5$ | g/l urea nitrate |
|---|---|---|---|---|
| 1 | 2300 | 0.84 | 1 | 22.1 |
| 2 | 2800 | 2.04 | 0.1 | 1.2 |

EXAMPLE 5

An amount of 270 g of an homogenous mixture of urea nitrate and urea phosphate containing 19.2% N (as urea), 6.2% N (as nitrate) and 16.2% $P_2O_5$ was introduced into a vessel (500 ml capacity) which was continuously fed with tap water. The resulting solution was supplied to the irrigation system.

The following pH and analyses were measured in the samples taken:

| Sample No. | Amount of outgoing solution (ml) | pH | g/l $P_2O_5$ | g/l urea nitrate |
|---|---|---|---|---|
| 1 | 1700 | 1.0 | 1 | 22.1 |
| 2 | 2200 | 2.0 | 0.1 | 5 |

EXAMPLE 6

A fertilizer tank (60 l capacity) was fed continuously with tap water and urea nitrate added batchwise so that the outgoing solution would have a pH below 3. The solution was supplied to a drip irrigation system, the diameter of the emitters being between 0.3 to 0.4 mm. The test was carried out for one month, and partial clogging was noticed only in less than 5% of the emitters.

A comparative test was also carried out with tap water alone; the clogging of the emitters was noticed to be above 25%.

EXAMPLE 7

An amount of 235 g of a 1:1 mixture of urea nitrate-urea was introduced into a vessel (500 ml capacity). Tap water was introduced continuously into the vessel at a rate of 3 l/h. The following pH were measured in the samples taken:

| Sample No. | Amount of outgoing solution (ml) | pH |
|---|---|---|
| 1 | 1500 | 2.0 |
| 2 | 1300 | 1.0 |

EXAMPLE 8

An amount of 25 kg. of urea nitrate together with 1 kg. urea phosphate was introduced into a fertilizer pump vessel operated by water pressure system. Water was continuously added into the vessel at the rate of the outgoing solution of about 90 l/h. The outgoing solution containing the urea nitrate and urea phosphate was further diluted with water at various ratios and supplied to the drip irrigation system. In the intermitent samples the pH measurements were as follows:

| Sample No. | Dilution ratio | pH |
|---|---|---|
| 1 | 1:10 | 1.25 |
| 2 | 1:20 | 1.50 |

| Sample No. | Dilution ratio | pH |
|---|---|---|
| 3 | 1:50 | 2.0 |

EXAMPLES 9-13

Various compositions containing urea nitrate as specified below were prepared. Batches of 250 g of homogenized compositions were introduced separately into a vessel (500 ml) thus obtaining the required N:P:K formulations. Tap water was added continuously into the vessel and the pH measured in the outgoing solution of each batch. The compositions and the pH measurements were as follows:

| Ex. No. | The composition used | Formulation obtained N:P:K | Amount of outgoing solution (ml) | pH measured |
|---|---|---|---|---|
| 9 | 0.80 kg. urea nitrate + 1 kg. urea phosphate | 1:1:0 | 1300 | 1.0 |
| 10 | 2.11 kg. urea nitrate + 1 kg. urea phosphate | 2:1:0 | 1300 | 1.0 |
| 11 | 0.80 kg. urea nitrate + 1 kg. urea phosphate + 0.71 kg. potassium chloride | 1:1:1 | 800 | 1.0 |
| 12 | 2.11 kg. urea nitrate + 1 kg. urea phosphate + 0.71 kg. potassium chloride | 2:1:1 | 1300 | 1.0 |
| 13 | 1 kg. urea nitrate + 0.54 kg. potassium | 1:0:1 | 1300 | 1.0 |

We claim:

1. A method for improving the smooth functioning of drip irrigation by applying a nitrogen-based composition being characterized by the fact that the said composition comprises urea nitrate which provides a pH ranging from about 0.05 to about 3.0, when urea nitrate is added to an aqueous solution in a quantity ranging from about 28 to 0.1 percent respectively based on the weight of the said aqueous solution.

2. A method for improving the smooth functioning of drip irrigation according to claim 1, wherein said composition further comprises one or more fertilizers selected from the group consisting of urea, urea phosphate, ammonium polyphosphate, mono-ammonium phosphate, potassium nitrate, potassium chloride.

3. A method for improving the smooth functioning of drip irrigation according to claim 1, wherein the pH of the outgoing solution is in the range of 0.25 to 2.6.

4. A method for improving the smooth functioning of drip irrigation according to claim 1, carried out through fertilizer tanks, fertilizer pumps or venturi-type meters.

5. The method of claim 2, wherein said composition has an N:P:K ratio of about 1:1:0.

6. The method of claim 2, wherein said composition has an N:P:K ratio of about 2:1:0.

7. The method of claim 2, wherein said composition has an N:P:K ratio of about 1:1:1.

8. The method of claim 2, wherein said composition has an N:P:K ratio of about 2:1:1.

9. The method of claim 2, wherein said composition has an N:P:K ratio of about 1:0:1.

10. The method of claim 2, wherein said composition comprises urea nitrate and urea phosphate.

11. The method of claim 2, wherein said composition comprises urea nitrate and ammonium polyphosphate.

12. The method of claim 2, wherein said composition comprises urea nitrate and urea.

13. The method of claim 2, wherein said composition comprises urea nitrate and potassium chloride.

* * * * *